Figure 1:
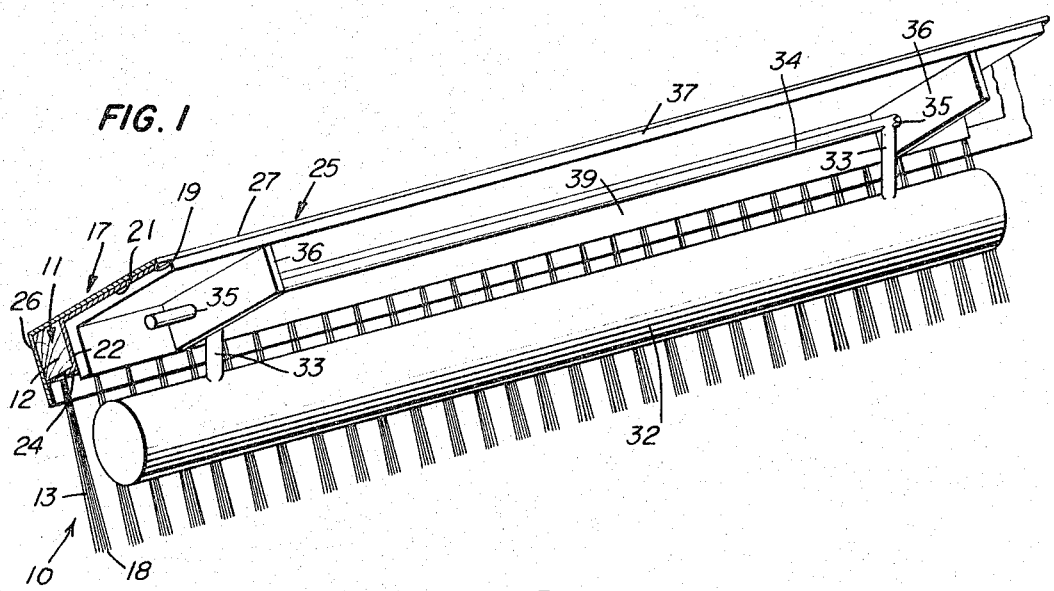

INVENTORS
Hoyle G. Moss
Edgar W. Walters

BY
Mason, Fenwick & Lawrence
ATTORNEYS

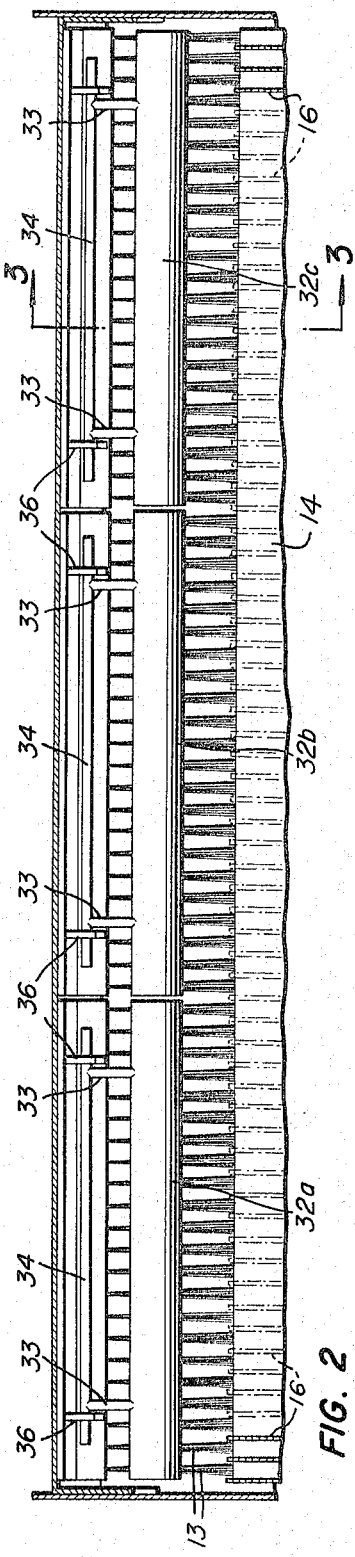
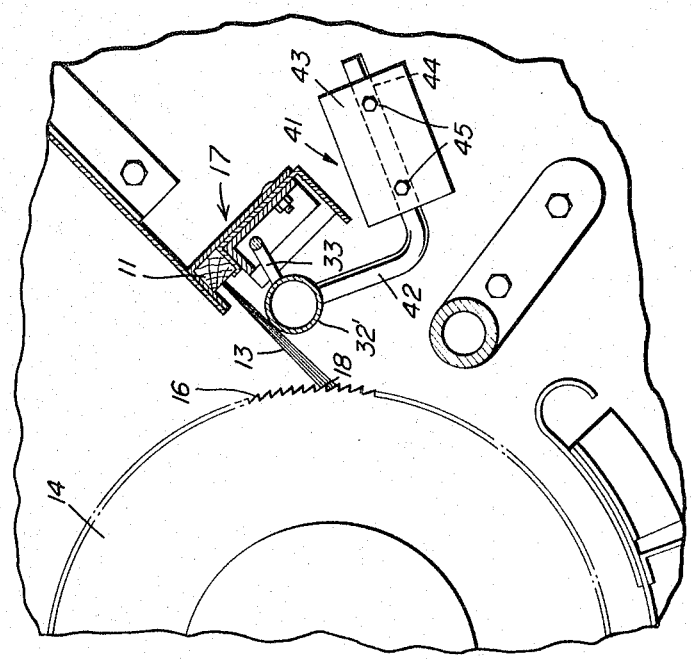

INVENTORS
Hoyle G. Moss
Edgar W. Walters

United States Patent Office 3,302,234
Patented Feb. 7, 1967

3,302,234
BRISTLE BIASING APPARATUS FOR SAW TOOTHED CYLINDER BRUSHES
Hoyle G. Moss and Edgar W. Walters, Lubbock, Tex., assignors to Botany Industries, Inc., Passaic, N.J., a corporation of New Jersey
Filed Jan. 6, 1964, Ser. No. 335,755
5 Claims. (Cl. 15—256.51)

The present invention relates in general to brush assemblies for maintaining fibrous material such as cotton and the like seated onto an associated conveyor, such as saw teeth of a revolving saw cylinder, and more particularly to brush assemblies of this type wherein rod means are maintained against the bristle of the brush in a manner to reduce the tendency to generate a set in the bristles which may otherwise occur from flow of fibrous material and associated foreign matter under the brush for a period of time.

Heretofore, it has been common to use brush units in association with rotary saw cylinders of the type used to convey and/or separate fibrous material such as cotton and the like from foreign matter such as dirt, sticks, leaves, and similar materials generally classified as trash. These brush units have customarily involved elongated bristles of natural, synthetic or metallic wire materials arranged in a generally planar path spanning the axial length of the saw cylinder with the upper ends of the bristles seated in a suitable base or holder block and the lower free ends thereof terminating at the periphery of the saw cylinder slightly out of contact therewith to maintain the fibrous material seated on the teeth of the saws. Such brush units have been commonly used in the cotton cleaning field such, for example, as in hull, stick and green leaf machines and reclaimer units. It has been discovered, however, that after such brush units have been in use for a period of time, a "set" or deformation is imparted to the bristles tending to restrain them in a curved or arcuate path curving away from the associated saw cylinder periphery, due to the constant passage of material between the ends of the bristles and the saw cylinder periphery such as large wads of cotton and harder trash. Thus it becomes apparent that the wire brushes in such stick and green leaf machines and reclaimer units do not fail because of wear on the bristles but from the curved set which develops in the bristles after constant use, destroying the proper spacing between the free ends of the bristles and the saw cylinder.

Efforts have been made to alleviate this problem by resorting to bristles of stronger materials or materials having higher elastic limits such that greater elastic restoring forces within the bristles themselves would resist formation of such a curved set. This approach has proved unsatisfactory however, as it has not been possible to use such strong materials, and avoid pre-ginning of the cotton. Resort to longer bristles also failed to provide a solution, as they also tend to take a curved set when large wads of cotton are carried under the brush by the saw teeth.

An object of the present invention, therefore, is the provision of simple and inexpensive means to be associated with brush units for use with rotary saw cylinders and similar conveyors in connection with processing of fibrous material, to reduce the tendency of a curved set to develop in brush bristles.

Another object of the present invention is the provision of novel means to be associated with the bristles of brush units designed to maintain fibrous material seated on rotary saw cylinders and the like while permitting passage of wads and undesired foreign matter thereunder, which novel means exerts a return force on the brush bristles intermediate the ends thereof tending to maintain the bristles in their normal substantially rectilinear configuration.

Another object of the present invention is the provision of a novel brush unit and means resisting formation of a curved set in the brush bristles, when the brush unit is employed in association with a rotary saw cylinder to maintain cotton and the like seated on the saw teeth, wherein rod members are gravitationally urged against the brush bristles to return the same to their normal rectilinear configuration.

Another object of the present invention is the provision of a novel brush unit and means resisting formation of a curved set in the brush bristles, when the brush unit is employed in association with a rotary saw cylinder to maintain cotton and the like seated on the saw teeth, wherein rod members are gravitationally urged against the brush bristles to return the same to their normal rectilinear configuration and to serve to increase holding pressure against cotton wads and resisting passage of the same through the brushes to facilitate combing of the wads by the saw teeth.

Other objects, advantages, and capabilities of the present invention will become apparent from the following detail description, taken in conjunction with the accompanying drawings illustrating a plurality of preferred embodiments of the invention.

Figure 3:
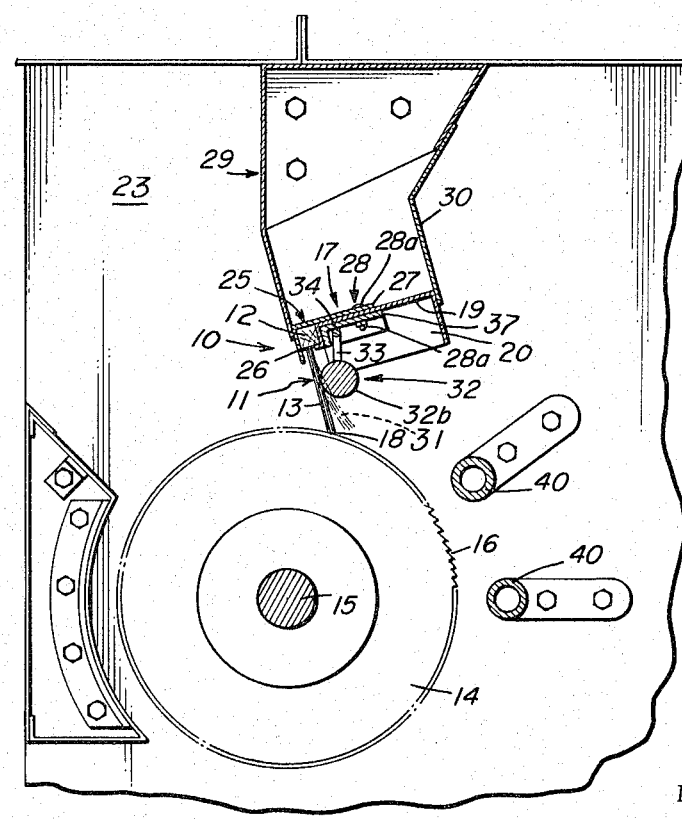
Figure 5:
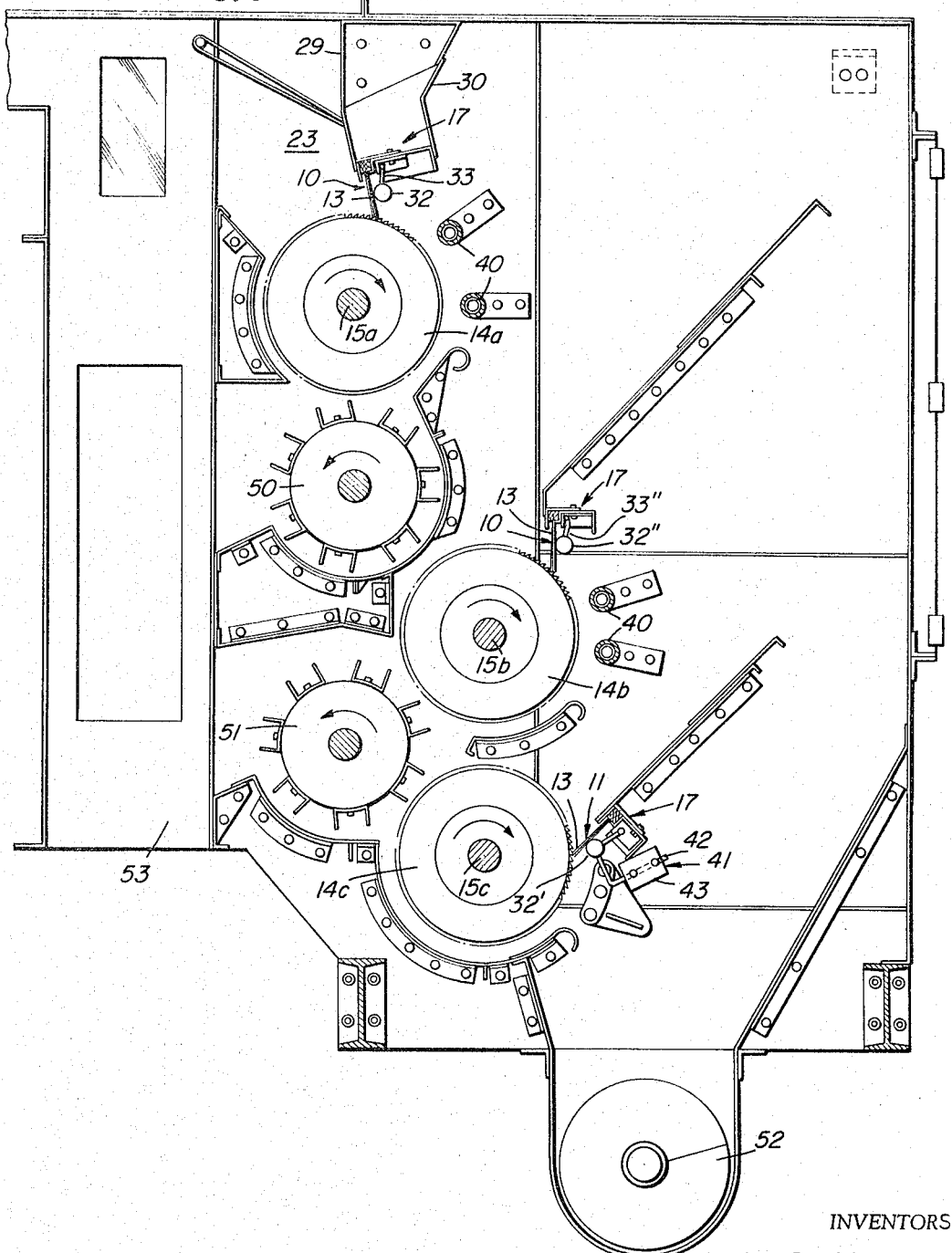

In the drawings:
FIGURE 1 is a perspective view of a fragmentary brush unit including an accessory section having set resisting rod means embodying the present invention;
FIGURE 2 is a rear elevation view of a whole brush unit and group of accessory sections of the type illustrated in FIGURE 1;
FIGURE 3 is a vertical transverse section view through the brush unit and saw cylinder forming one stage of a bulk extractor machine such as a hull, stick and green leaf machine, taken along the line 3—3 of FIGURE 2;
FIGURE 4 is a vertical transverse section view of a modified form of brush unit and an associated saw cylinder, wherein the brush bristles lie at a large angle to the vertical and counterweight means are provided to position the set resisting rod means to minimize curved set formation; and
FIGURE 5 is a fragmentary section of a hull, stick and green leaf machine for processing said cotton, showing three saw cylinder stages with brush assemblies embodying the present invention associated with each stage adapted to resist occurrence of deforming sets in bristles arranged at different normal angular relations to their associated saw cylinders.

The present invention will be described in connection with brush units of the type especially adapted to be used in bulk extractors for seed cotton, of the hull, stick and green leaf machines type presently commercially used to separate trash such as sticks, leaves, vines, hulls, stems, clods and other known trash, from seed cotton preparatory to feeding the seed cotton to a gin stand, for convenience of understanding in connection with this particular application. From this description, the manner of application of the present invention to other devices and arrangements will become apparent to persons skilled in the art.

Referring to the drawings, wherein like reference characters designate corresponding parts throughout the several figures, and particularly to FIGURES 1, 2 and 3 illustrating one form of the present invention, the brush unit constructed in accordance with the invention is indicated generally by the reference character 10 and includes a brush 11 which may be similar in all respects to commercially available brushes for use with the saw cylinder of a hull, stick and green leaf machine or a reclaimer unit. Such brushes are customarily formed of an elongated wooden holder 12 having a substantially rectangular or square cross section and a lower face provided with longitudinally spaced sockets in which groups of bristles 13 are secured. The bristles 13 may, in accordance with customary practice, be formed of wire, such for example as spring steel wire of very small diameter folded in half, with the folded or recurved portion seated in the sockets in the wooden holder, or may be formed of natural or synthetic filaments or bristle material. The groups of bristles 13 are arranged in a generally planar pattern along the length of the brush holder 12, with the bristles extending normally along substantially rectilinear paths. For illustrative purposes, the brush unit 10 is shown in FIGURES 1, 2 and 3, in one typical position normally assumed by such a brush unit relative to a rotary saw cylinder 14, of a hull, stick and green leaf machine, having a driven central shaft 15 and cotton conveying saw teeth 16 along the periphery thereof.

In the embodiment illustrated in the above-mentioned figures, the brush 11 is supported by a suitable brush mounting assembly 17 in a position disposing its bristles 13 along a plane inclining slightly from the vertical toward the direction of travel of the saw teeth with the lower or free ends 18 of the bristles disposed closely adjacent but out of actual contact with the periphery of the saw cylinder 14. The illustrative brush mounting assembly 17 consists simply of a bracket 19 formed for example of sheet metal having depending end flanges 20 for securing the same to the sides of the machine casing and including a top panel 21 and a depending flange 22 at the forward edge thereof adjacent the input feed hopper of the machine, indicated at 23. The flange 22 may include a forwardly projecting lip 24 at the lower end thereof which may either be integral with the flange 22 or be formed of a separate element and secured thereto. Coacting with the bracket 19 is an angle member 25 having a depending flange 26 adapted to extend downwardly in parallelism with the flange 22 and form a suitable well for supporting and clamping the brush holder 12 therebetween, and a top flange 27 which laps over the top panel 21 of the bracket 19 and is adjustably secured thereto by a bolt and slot connection indicated generally at 28 comprising slots in the top flange 27 permitting adjustment of the angle member so as to vary the spacing of the side flange 26 relative to the flange 22 and bolts 28a extending through the slots in the top flange 27 and through suitable bolt-receiving apertures in the top panel 21. This brush unit and mounting assembly is illustrated as located at the foot of a sheet metal panel formation 29 depending from the top of the machine casing and forming a divider partition for separating certain chambers or zones within the casing, access being had to the bolt and slot connection 28 in such an installation by making one of the sheet metal panels, for example, the panel 30, of the formation 29 removable.

In such an arrangement, if no provision were made to facilitate return of the bristles 13 to their normal rectilinear configuration other than the inherent memories of the bristles, the bristles would, over a long period of use, tend to assume a curved set or permanent change of form to a configuration somewhat resembling that indicated by the broken lines 31 in FIGURE 3 due to repeated or excessive bending stresses on the lower free ends of the bristles as the material conveyed by the sawteeth 16 flexes the bristles to assume such an arcuate configuration curving in the direction of travel of the sawteeth upon passage thereunder. As the function of the brush 11 is to maintain the cotton fibers seated on the sawteeth so that the cotton will be conveyed around the saw cylinder to a suitable doffing point, while permitting the foreign material or trash which passes under the brush to be drawn off from the periphery of the saw cylinder through centrifugal force, the foreign matter being relatively incompressible and of greater density than the density of the seed cotton, it is apparent that the desired function of the brush would be lost in time as the bristles 13 assume the curved set and the free ends 18 of the bristles attain a position spaced sufficiently far from the sawteeth 16 to render them ineffective to further maintain the cotton seated on the sawteeth.

This problem is overcome in the brush unit of the present invention by providing a bristle biasing accessory which can be readily assembled onto conventional brush units and which exerts an external return force on the brush bristles 13 to continuously urge them to return to their normal rectilinear configuration, but which is sufficiently yieldable to permit the more incompressible foreign material to flex the brush bristles rearwardly and pass beneath the brush. This accessory in the preferred form illustrated in FIGURES 1 to 3, and in the two upper saw cylinder stages of FIGURE 5, of a pendulum-like rod bearing against the posterior surfaces of the groups of bristles 13 relative to the direction of saw travel to gravitationally urge the bristles to return to their normal rectilinear state. Specifically, the rod means is formed of a plurality of axially aligned independent rod sections, indicated as a group by the reference character 32, and formed in the exemplary embodiment of three axially aligned sections 32a, 32b and 32c spanning the length of the brush 11 and corresponding substantially to the axial length of the saw cylinder 14. The rod sections 32a–32c are identical in construction and each includes hanger legs 33 depending from a hanger shaft 34, the legs being integral with the shaft 34 if desired, and the opposite ends of the shaft 34 projecting beyond the legs 33 into journaled relation in apertures 35 of depending journal plates 36 extending from a mounting plate 37. The mounting plate 37 is preferably provided with apertures to be aligned with the bolts 28a of the bolt and slot connections 28 by which the bracket 19 and angle member 24 are assembled together so that the bolts 28a may be extended through the apertures of the rod mounting plate 37 to secure each of these elements rigidly together by the same mounting bolts.

The rods 32a–32c are of an appropriate diameter relative to the central axes of the hanger shafts 34, and the apertures 35 journaling the hanger shafts 34 are appropriately located relative to the brush bristles 13, so that the rod 32 is normally disposed in very light contact with the brush bristles 13 when the bristles assume their normal rectilinear configuration whereby the bristles conform to tangents of the rod periphery. The mounting plate 37 may be an angle member form to provide a depending flange 39 along the edge thereof adjacent the brush and may be disposed to be abutted by the hanger legs 33 when the rods 32 assume the normal desired position establishing light contact with the rectilinear bristles 13 to form a limit stop for the rod units. A plurality of such bristle biasing rod sections, for example three, are provided to eliminate lifting of a biasing rod of the whole axial length of the cylinder when wads or other foreign matter along one transverse portion of the saw cylinder less than the width of a rod section engage the associated brush and raise the rod section adjacent thereto.

For ease of understanding of the environmental structure in the bulk extractor machine application of the present invention, there are also illustrated in FIGURE 3 a plurality of stationary cleaning bars or grid bars 40 adjacent the periphery of the saw cylinder 14 as the same may be found in a typical bulk extractor machine installation.

In the operation of the bristle biasing accessory of the present invention in conjunction with the exemplary bulk extractor machine application illustrated in FIGURE 3, the bristle biasing accessory comprising the three rod sections 32a, 32b and 32c are initially arranged on the brush mounting assembly 25 so that they are gravitationally located at a quiescent position in very light contact with the posterior surfaces of the bristles 13 to the sides of the bristles facing in the direction of travel of the adjacent sawteeth 16. The seed cotton together with the intermingled foreign matter such as dirt, sticks, leaves, stems, vines, hulls, clods and like trash, are dumped into the bulk extractor machine into the feed hopper zone identified by the reference character 23. As the sawteeth 16 on the periphery of the saw cylinder 14 rotate at high speed, the sawteeth grip the seed cotton fibers and feed them circumferentially along the path traveled by the sawteeth to the usual doffing station (not shown) where the seed cotton is extracted from the sawteeth and conveyed along a desired subsequent path. As the seed cotton falls onto the sawteeth from the inlet hopper zone, the seed cotton is drawn beneath the lower or free edges 18 of the bristles 13, the bristles exerting a downward pressure on the seed cotton to facilitate reliable seating of the cotton on the sawteeth. Larger wads of cotton are restrained against movement through or under the bristles 13, both by the inherent elastic properties of the bristles and by the restraining pressure exerted by the rods 32 against the bristles, so that the sawteeth are permitted to work the wad of cotton and progressively withdraw portions thereof under the brush until the wad is effectively dissipated. The rod accessory units are arranged so that the rods 32 are movable about a given arc, the bottom or lowermost zone of which is adjacent the brush bristles and movable against the gravitational force on the rods away from this normal location in the direction of travel of the sawteeth, so that when the cotton from the inlet hopper falls to the saw, and as the sawteeth pick up the cotton and pull it under the bristles 13, the bristles yield to the pressure of the cotton and move rearwardly or in the direction of cotton travel, which movement exerts pressure on the bars 32 and moves them in a corresponding direction. This displacement of the rods exerts a pressure on the bristles 13 related to that exerted from the incoming or opposite direction and therefore causes the cotton to be better seated into the sawteeth.

The more dense foreign material is thrown off from the periphery of the saw cylinder in substantially tangential directions by the centrifugal force exerted thereon and the propulsion of the foreign material by the sawteeth, this foreign material being either drawn under the brush bristles 13 or forced through the brush between the brush bristles and producing a general deflection of the brush bristles toward the direction of travel of the cotton. However, due to the constant returning force exerted by the freely hung rods 32 when the same are displaced from their normal gravity urged positions, the rods 32 assist return of the bristles 13 to their normal rectilinear configuration and position at all times when the bristles are not flexed to curved configuration by engagement of foreign matter or cotton wads being driven therethrough or thereagainst. The foreign matter, due to its greater density and therefore greater centrifugal force effects, continues to be slung from the saw cylinder periphery over the remainder of the path of travel of the sawteeth to the doffing station, the cotton being retained on the sawteeth over the zone beyond the brush 11 by the grid rods 40 in a known manner.

FIGURE 4 illustrates a modified construction for the bristle biasing accessory which may be employed when the bristles occupy a position inclined at a large angle to the vertical and toward the inlet hopper, rather than inclining along the direction of cotton travel, and which modified form may be used with slight variations wherever the bristle inclination is such that a simple pendulum type rod arrangement does not dispose the rod in light contact with the bristles at the normal or steady state gravity urged position of the rod. In the FIGURE 4 embodiment, the components for the most part correspond to the components illustrated in FIGURES 1 to 3 so that those parts of the FIGURE 4 construction which are the same as parts of the FIGURE 1 construction are identified by the same reference characters. In the FIGURE 4 construction, the brush bristles 13 of the brush 11 are inclined at an angle of about 45° to the left as viewed in FIGURE 4 with their free ends 18 lying adjacent the sawteeth 16 of the saw cylinder 14 at approximately the three o'clock location. Mounting assembly 17 for the brush 11 and the mounting plate 37 and hanger components 33 and 34 of the bristle biasing accessory of FIGURE 4 are identical with those components of the earlier described embodiment. The rod 32' thereof, however, is in this embodiment formed preferably of a hollow tube rather than a solid rod or of a material having a lower weight, and is provided with a counterweight assembly indicated generally at 41. The counterweight assembly 41 comprises a rigid radially extending arm 42 welded or otherwise suitably fixed to the rod 32' and having a counterweight 43 slidably supported on the arm 42 for movement along the length thereof. The counterweight 43 may be a solid counterweight block in the general form of a rectangular solid having central bore 44 extending longitudinally therethrough corresponding in cross section to the cross section of the arm 42, together with set screws 45 disposed in suitable tapped openings extending through a side of the counterweight 43 and communicating with the bore 44, so that the set screws 45 can be adjusted into locking engagement with the radial arm 42 at the desired adjusted position of the counterweight. By this arrangement, the rod 32' is gravitationally urged to a steady state position offset toward the brush from the vertical plane including the axis of the hanger shaft 34, the counterweight 43 being adjustable to a position such that the rod 32' will normally be in light contact with the bristles 13 when the latter are in quiescent or normally rectilinear position, serving the same function and having the same effect as the rod 32 in the preceding embodiment.

FIGURE 5 illustrates a typical bulk extractor machine installation having a first stage saw cylinder 14a, a second stage saw cylinder 14b, and a third stage saw cylinder 14c, together with appropriate intervening doffing cylinders 50 and 51, a trash conveyor 52 for removing dislodged trash from the machine to a suitable external location, and a seed cotton outlet duct 53. Associated with the first stage cylinder 14a is a brush unit 10 and associated bristle biasing accessory of the type illustrated in FIGURES 1 to 3, while a brush and bristle biasing accessory having a counterweighted rod 32' of the type illustrated in FIGURE 4 is associated with the last stage of cylinder 14c. The intermediate or second stage saw cylinder 14b has a brush unit associated therewith, wherein the bristles lie in a substantially vertical plane, and the bristle biasing accessory includes a rod 32" like the rod 32 of the FIGURES 1–3 embodiment, but wherein the hanger legs 33" are angularly curved to provide a slight offset so as to permit the rod 32" to properly engage the bristles at its normal gravity urged position.

While several preferred embodiments of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. In combination with a rotary saw cylinder having teeth onto which fibers are to be seated for conveyance in an arcuate path in fiber processing apparatus and a brush adjacent a peripheral portion of said saw cylinder for maintaining the fibers seated on said teeth, said brush having a row of elongated flexible bristles of normally substantially rectilinear configuration projecting from a support and terminating in free working ends aligned generally along a reference axis and disposed closely adjacent the periphery of the saw cylinder, said row of bristles having an anterior side and a posterior side facing respectively toward and away from said saw cylinder, apparatus for resisting formation of a deformed set in said bristles departing from their normal configuration when the bristles are subject to prolonged deforming forces by wads of the fibers and harder foreign matter passing between the bristles and the periphery of the saw cylinder comprising rectilinear elongated rod means substantially spanning the row of bristles and disposed adjacent said posterior side of said row, hanger means pivotally supporting said rod means in parallelism with said reference axis for movement through an arcuate path about a pivot axis above said rod means and adjacent said brush support between a normal position lightly engaging said bristles and a displaced position spaced along said arcuate path from said normal position in a direction away from said saw cylinder, said rod means being freely movable about said pivot axis and gravitationally urged to said normal position and having sufficient mass to force said bristles to their normally substantially rectilinear configuration when free of distorting forces produced by said wads and foreign matter.

2. The combination defined in claim 1, wherein said rod means comprise a plurality of axially aligned rods which collectively span the row of bristles, each of said rods being supported by said hanger means for movement independently of the remaining rods whereby each of said rods may be independently displaced along said arcuate path from said normal position without affecting the remaining rods.

3. Bristle biasing means for use with a brush and rotary toothed saw cylinder assembly of the type employed for conveying fibrous material and separating trash therefrom wherein the brush includes an elongated holder having a row of elongated flexible bristles of normally substantially rectilinear configuration projecting therefrom and terminating in free ends aligned in substantial parallelism with the axis of said cylinder adjacent the periphery of the saw cylinder to maintain the fibers seated on the teeth of the saw cylinder, the row of bristles having an anterior side facing the cylinder and a posterior side facing away from the cylinder, said bristle biasing means serving to resist formation of a deformed set in the bristles departing from their normal configuration when the bristles are subjected to prolonged deforming forces by wads of fibers and harder foreign matter passing between saw cylinder and said bristles propelled by the saw cylinder along a direction of travel of the teeth thereof and comprising a hanger shaft journaled for rotary movement about a stationary pivot axis paralleling said cylinder axis adjacent said brush holder at a downstream side thereof relative to said direction of travel of the cylinder teeth, an elongated rod member spanning at least a substantial portion of said row of bristles in parallelism with said cylinder axis intermediate said holder and free ends alongside the posterior side of said row of bristles, and dependent arm means rigidly interconnecting said shaft and rod member supporting the latter for free movement through an arcuate path about said shaft, said rod member being gravitationally urged to a normal position engaging the posterior side of said row of bristles and urging the bristles in a direction toward said cylinder to their normal substantially rectilinear configuration when free of deforming forces produced by said wads and foreign matter.

4. Bristle biasing means for use with a brush and rotary toothed saw cylinder assembly of the type employed for conveying fibrous material and separating trash therefrom wherein the brush includes an elongated holder having a row of elongated flexible bristles of normally substantially rectilinear configuration projecting therefrom and terminating in free ends aligned in substantial parallelism with the axis of said cylinder adjacent the periphery of the saw cylinder to maintain the fibers seated on the teeth of the saw cylinder, the row of bristles having an anterior side facing the cylinder and a posterior side facing away from the cylinder, said bristle biasing means serving to resist formation of a deformed set in the bristles departing from their normal configuration when the bristles are subjected to prolonged deforming forces by wads of fibers and harder foreign matter passing between saw cylinder and said bristles propelled by the saw cylinder along a direction of travel of the teeth thereof and comprising a plurality of hanger units each including a hanger shaft journaled for rotary movement about a stationary pivot axis paralleling said cylinder axis adjacent said brush holder at a downstream side thereof relative to said direction of travel of said saw cylinder teeth, an elongated rod member spanning a portion of said row of bristles in parallelism with said cylinder axis intermediate said holder and free ends alongside the posterior side of said row of bristles, and dependent arm means rigidly interconnecting said shaft and rod member supporting the latter for free movement through an arcuate path about said shaft, said hanger units being disposed in series relation alongside the brush with the hanger shafts thereof in axial alignment and the rod members thereof collectively spanning the whole row of bristles, said rod members being gravitationally urged toward said saw cylinder to a normal position engaging the posterior side of said row of bristles and urging the bristles in a corresponding direction to their normal substantially rectilinear configuration when free of deforming forces produced by said wads and foreign matter.

5. Bristle biasing means for use with a brush and rotary toothed saw cylinder assembly of the type employed for conveying fibrous material and separating trash therefrom wherein the brush includes an elongated holder having a row of elongated flexible bristles of normally substantially rectilinear configuration projecting therefrom and terminating in free ends aligned in substantial parallelism with the axis of said cylinder adjacent the periphery of the saw cylinder to maintain the fibers seated on the teeth of the saw cylinder, the row of bristles having an anterior side facing the cylinder and a posterior side facing away from the cylinder, said bristle biasing means serving to resist formation of a deformed set in the bristles departing from their normal configuration when the bristles are subjected to prolonged deforming forces by wads of fibers and harder foreign matter passing between saw cylinder and said bristles propelled by the saw cylinder along a direction of travel of the teeth thereof and comprising a plurality of hanger units each including a hanger shaft journaled for rotary movement about a stationary pivot axis paralleling said cylinder axis adjacent said brush holder at a downstream side relative to said direction of travel of said saw cylinder teeth, an elongated rod member spanning at least a substantial portion of said row in parallelism with said cylinder axis intermediate said holder and free ends alongside the posterior side of said row of bristles, dependent hanger arms rigidly interconnecting said shaft and rod member supporting the latter for free movement through an arcuate path about said shaft, and counterweight means including an adjustable counterweight member supported on said rod member for movement to selected positions along a projected radius of said rod member extending in a direction away from the brush and saw cylinder, said rod member being urged by gravitational forces on said rod member and counterweight means to a normal position horizontally offset from the vertical plane including said pivot axis wherein the rod member engages the posterior side of said row of bristles and urges the bristles toward said saw cylinder to their normal substantially rectilinear configuration when free of deforming forces produced by said wads and foreign matter.

References Cited by the Examiner

UNITED STATES PATENTS

| | | | |
|---|---|---|---|
| 943,319 | 12/1909 | Schulz | 15—168 |
| 1,287,818 | 12/1918 | Armstrong | 15—168 |
| 1,806,911 | 5/1931 | Oslund et al. | 15—168 |
| 3,046,611 | 7/1962 | Vandergriff | 19—35 |

CHARLES A. WILLMUTH, *Primary Examiner.*

WALTER A. SCHEEL, *Examiner.*

L. G. MACHLIN, *Assistant Examiner.*